US010633816B2

(12) United States Patent
Jensen (10) Patent No.: US 10,633,816 B2
(45) Date of Patent: Apr. 28, 2020

(54) GROUND THAWING DEVICE

(71) Applicant: Daniel Jensen, Cannon Falls, MN (US)

(72) Inventor: Daniel Jensen, Cannon Falls, MN (US)

( * ) Notice: Subject to any disclaimer, the term of this patent is extended or adjusted under 35 U.S.C. 154(b) by 0 days.

(21) Appl. No.: 15/614,710

(22) Filed: Jun. 6, 2017

(65) Prior Publication Data

US 2017/0350086 A1     Dec. 7, 2017

Related U.S. Application Data

(60) Provisional application No. 62/345,932, filed on Jun. 6, 2016.

(51) Int. Cl.
| | |
|---|---|
| *E02D 3/11* | (2006.01) |
| *B02C 1/06* | (2006.01) |
| *E02F 5/30* | (2006.01) |
| *F16L 1/026* | (2006.01) |

(52) U.S. Cl.
CPC .................. *E02D 3/11* (2013.01); *E02F 5/30* (2013.01); *F16L 1/026* (2013.01)

(58) Field of Classification Search
CPC .......... F17C 2203/00; F17C 2203/0604; F17C 2203/0607; E02D 29/16; E02D 7/12; E02D 3/11; E21D 11/385; B09C 1/06
USPC ......... 126/271.1, 271.2 R, 271.2 A, 271.2 C, 126/271.3, 389, 21 A, 91 A; 165/45; 405/131, 56, 57, 152, 234; 37/227, 230
See application file for complete search history.

(56) References Cited

U.S. PATENT DOCUMENTS

| | | | | | |
|---|---|---|---|---|---|
| 1,322,459 | A | * | 11/1919 | Mattern ................. | E01C 23/14 126/271.2 A |
| 1,521,493 | A | * | 12/1924 | Whikehart .............. | F23D 14/10 137/583 |
| 1,571,883 | A | * | 2/1926 | Belanger ............... | A01M 15/00 126/271.2 R |
| 1,683,359 | A | * | 9/1928 | Klopsteg ................. | B01J 3/006 219/399 |
| 1,843,662 | A | * | 2/1932 | Craig ....................... | F23D 1/00 431/184 |
| 2,007,739 | A | * | 7/1935 | Brandjord ............. | A01M 15/00 431/245 |
| 3,132,642 | A | * | 5/1964 | Fingland ................. | E01C 23/14 126/271.2 R |
| 3,176,680 | A | * | 4/1965 | White ..................... | E01C 19/05 126/271.2 R |

(Continued)

*Primary Examiner* — Benjamin F Fiorello
*Assistant Examiner* — Edwin J Toledo-Duran
(74) *Attorney, Agent, or Firm* — Boudwin Intellectual Property; Daniel Boudwin (57) ABSTRACT

A ground thawing device. The ground thawing device includes an insulated rectangular housing defining an interior volume with parallel sidewalls, end walls, and an open bottom. A pipe having a burn chamber connected to a first end and a second end adapted to connect to an external source of combustible gases is configured to be received through apertures disposed on the end walls. Perforations disposed along the length of the pipe allow for the combustible gas to be released in the interior volume of the housing. The burn chamber allows for an ignition source to be applied to the combustible gases carried therein. Once ignited, heat emanating from the pipe warms the interior volume and thaws the ground beneath, softening frozen soil to be excavated.

17 Claims, 6 Drawing Sheets

(56) References Cited

U.S. PATENT DOCUMENTS

| | | | | |
|---|---|---|---|---|
| 3,293,863 A | * | 12/1966 | Cox | E02F 5/30 405/131 |
| 3,311,104 A | * | 3/1967 | Wollner | E01C 23/14 126/92 R |
| 3,471,681 A | * | 10/1969 | Miller | H05B 3/00 392/379 |
| 3,590,804 A | * | 7/1971 | Welshofer | F24C 14/025 126/11 |
| 3,626,636 A | * | 12/1971 | Wheeler | A01G 13/06 47/5 |
| 3,688,760 A | * | 9/1972 | Walter | F23C 3/002 126/91 A |
| 3,762,549 A | * | 10/1973 | Crampton | C02F 1/048 210/123 |
| 3,762,639 A | * | 10/1973 | Katchka | F23N 5/107 236/15 A |
| 3,809,060 A | * | 5/1974 | Shirley | A01M 15/00 126/271.2 C |
| 4,140,443 A | * | 2/1979 | Olson | F04B 53/14 417/490 |
| 4,147,116 A | * | 4/1979 | Graybill | F23D 1/00 110/263 |
| 4,770,160 A | * | 9/1988 | Schimmeyer | F16K 17/12 110/163 |
| 4,996,970 A | * | 3/1991 | Legare | A45F 3/04 126/205 |
| 5,033,452 A | * | 7/1991 | Carriere | E02F 5/30 126/271.1 |
| 5,146,911 A | * | 9/1992 | Adams | F24H 1/186 122/17.1 |
| 5,181,655 A | * | 1/1993 | Bruckelmyer | E02D 3/11 165/45 |
| 5,261,765 A | * | 11/1993 | Nelson | B09C 1/06 405/128.6 |
| 5,425,923 A | * | 6/1995 | Swisher, Jr. | B09C 1/06 422/168 |
| 5,441,038 A | * | 8/1995 | Ohmann | A01B 1/00 126/271.1 |
| 5,480,226 A | * | 1/1996 | Milstead | E01C 19/1036 34/137 |
| 5,499,586 A | * | 3/1996 | Davis | B09C 1/06 110/203 |
| 5,658,094 A | * | 8/1997 | Clawson | B09C 1/06 110/236 |
| 5,820,301 A | * | 10/1998 | Bruckelmyer | E01C 3/06 405/229 |
| 5,826,371 A | * | 10/1998 | Benjamin | A01M 15/00 47/1.44 |
| RE36,222 E | * | 6/1999 | O'Ham | B09C 1/06 110/233 |
| 6,148,146 A | * | 11/2000 | Poore | F24H 1/20 122/13.3 |
| 6,194,686 B1 | * | 2/2001 | Gohl | H05B 3/26 126/271.1 |
| 6,283,749 B1 | * | 9/2001 | Bernard, Jr. | F27B 17/0083 373/112 |
| 6,408,843 B1 | * | 6/2002 | Olson | A01M 21/04 126/271.1 |
| 6,462,319 B1 | * | 10/2002 | Uy | H05B 6/6405 126/21 A |
| 8,544,460 B2 | * | 10/2013 | Befus | E01C 23/14 126/271.1 |
| 2002/0192030 A1 | * | 12/2002 | Almeida | A62D 3/19 405/128.65 |
| 2005/0029403 A1 | * | 2/2005 | Bourgault | E01H 5/106 244/134 C |
| 2005/0056270 A1 | * | 3/2005 | Babington | A47J 27/18 126/275 R |
| 2005/0084409 A1 | * | 4/2005 | Pivonka | A01M 15/00 422/1 |
| 2007/0003897 A1 | * | 1/2007 | Koizumi | F23R 3/04 431/354 |
| 2007/0141522 A1 | * | 6/2007 | Borders | F23D 14/20 431/354 |
| 2007/0176011 A1 | * | 8/2007 | Peterson | E01C 23/14 237/69 |
| 2010/0263751 A1 | * | 10/2010 | Ringuette | B09C 1/06 137/565.17 |
| 2013/0062034 A1 | * | 3/2013 | Befus | E01C 23/14 165/45 |
| 2015/0014326 A1 | * | 1/2015 | Johnson | A47J 37/128 220/573.1 |
| 2018/0249620 A1 | * | 9/2018 | Hardman | A01B 45/02 |

* cited by examiner

GROUND THAWING DEVICE

CROSS REFERENCE TO RELATED APPLICATIONS

This application claims the benefit of U.S. Provisional Application No. 62/345,932 filed on Jun. 6, 2016. The above identified patent application is herein incorporated by reference in its entirety to provide continuity of disclosure.

BACKGROUND OF THE INVENTION

The present invention relates to ground thawing devices as well as portable heat delivery systems. More specifically, the present invention provides a ground thawing device having a housing with an open bottom and a gas delivery pipe adapted to connect to an outside adjustable delivery system for flammable gas.

People need to excavate and dig through the ground for numerous reasons, such as to repair subterranean pipes, dig graves, install foundations, etc. During the colder months of the year, frost and snowfall can make it nearly impossible to dig through the ground. People are forced to either wait until the ground thaws or use heavy machinery in order to dig through the excavation area. This can be an inconvenient and costly process. Further, frozen pipes could burst and cause extensive damage if not repaired in a timely fashion. Heavy machinery such as a backhoe requires special training to operate, and may also be cost prohibitive for small contractors and individual homeowners.

In light of the devices disclosed in the known art, it is submitted that the present invention substantially diverges in design elements from the known art and consequently it is clear that there is a need in the art for an improvement to existing ground thawing devices. In this regard, the instant invention substantially fulfills these needs.

SUMMARY OF THE INVENTION

In view of the foregoing disadvantages inherent in the known types of thawing devices now present in the prior art, the present invention provides a ground thawing device wherein the same can be utilized for providing convenience for the user when excavating through frozen ground during the colder weather months of the year.

It is therefore an object of the present invention to provide a new quick thaw ground defroster that has all of the advantages of the prior art and none of the disadvantages.

It is another object of the present invention to provide a quick thaw ground defroster comprising a housing having a first planar surface wherein sidewalls extend orthogonally downward on the edges therefrom and connect to form an enclosure with open bottom. Apertures located on opposing sidewalls and axially aligned are configured to receive a length of pipe. The pipe having a burn chamber connected to a first end and a second end adapted to connect to an external source of combustible gases, wherein perforations disposed along the length of the pipe allow for gas expulsion.

It is another object of the present invention to provide a quick thaw ground defroster wherein the housing is rectangular.

It is another object of the present invention to provide a quick thaw ground defroster wherein axially aligned apertures are disposed on the sidewall and adapted to receive a length of pipe.

It is another object of the present invention to provide a quick thaw ground defroster wherein two or more pipes are disposed through apertures in the sidewall and aligned in pair parallel.

It is another object of the present invention to provide a quick thaw ground defroster wherein handles are disposed on the exterior of the sidewall.

It is yet another object of the present invention to provide a quick thaw ground defroster having a plurality of pipes running longitudinally through the enclosed housing.

It is another object of the present invention to provide a quick thaw ground defroster wherein apertures oriented toward the open bottom of the housing are disposed in a spaced relationship along the length of pipe.

Another object of the present invention is to provide a quick thaw ground defroster having a dual layer housing enclosure wherein thermal insulation is disposed therebetween.

Another object of the present invention is to provide a quick thaw ground defroster wherein heat capture flaps are disposed along the exterior of the sidewalls toward the open bottom of the enclosed housing.

Yet another object of the present invention is to provide a quick thaw ground defroster wherein the aperture flange has a mechanism for securing the pipe in place.

Another object of the present invention is to provide a quick thaw ground defroster wherein a bracket disposed on the exterior of the sidewall is adapted to secure an indicator.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the ground thawing device. For the purposes of presenting a brief and clear description of the present invention, the preferred embodiment will be discussed as used for thawing a section of soil on level ground. The figures are intended for representative purposes only and should not be considered to be limiting in any respect.

Referring now to FIGS. 1A, 1B, 1C and 2, there is shown a side elevation view of a first end, a front elevation view, and a side elevation view of a second end of the ground thawing device as well as a perspective view of an embodiment of the ground thawing device, respectively. The ground thawing device 11 comprises a housing having a base 12 and a sidewall 13 extending from the perimeter thereof. The base 12 and sidewall 13 define an enclosed interior volume having an open lower side. In the shown embodiment, the ground thawing device 11 has a rectangular configuration. However, in alternative embodiments, the ground thawing device 11 may be circular or any other suitable shape.

One or more apertures 19 are disposed along the sidewall 13 of the housing. In the shown embodiment, the apertures 19 are axially aligned in the sidewall 13 such that a straight length of pipe may be received through opposing apertures 19 disposed on an opposite end of the sidewall 13. Flanges 17 extend outwardly from the apertures 19 and away from the enclosed volume of the housing. In this way, the flanges 17 assist with the receiving and securement of the pipe therethrough. Fasteners 18 located on the flange 17 extending from the sidewall 13 are adapted to removably secure a length of pipe in place within the aperture 19.

In the shown embodiment, a pair of pipes extend from opposing apertures 19 to traverse the housing. The pipes are configured to be in fluid communication with a valve, wherein the valve is adapted to regulate a flow of fuel from a fuel source therethrough.

Figure 1A:
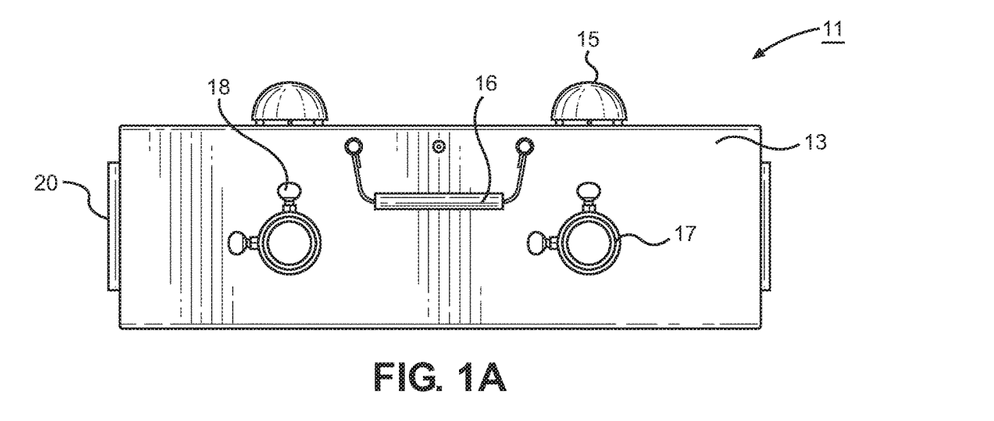
FIG. 1A shows a side elevation view of a first end of an embodiment of the ground thawing device.
Figure 1B:
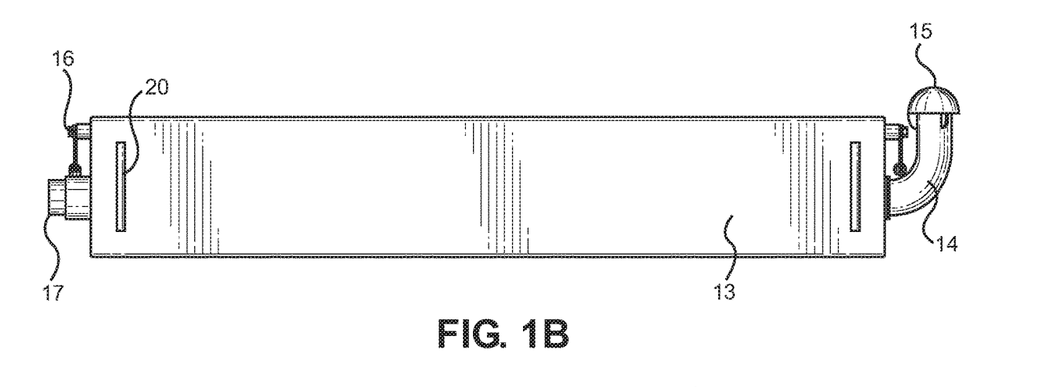
FIG. 1B shows a front elevation view of an embodiment of the ground thawing device.
Figure 1C:
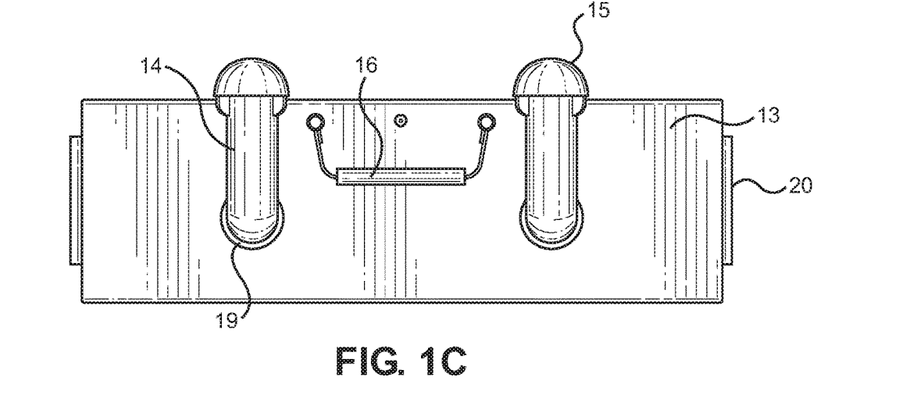
FIG. 1C shows a side elevation view of a second end of an embodiment of the ground thawing device.
Figure 2:
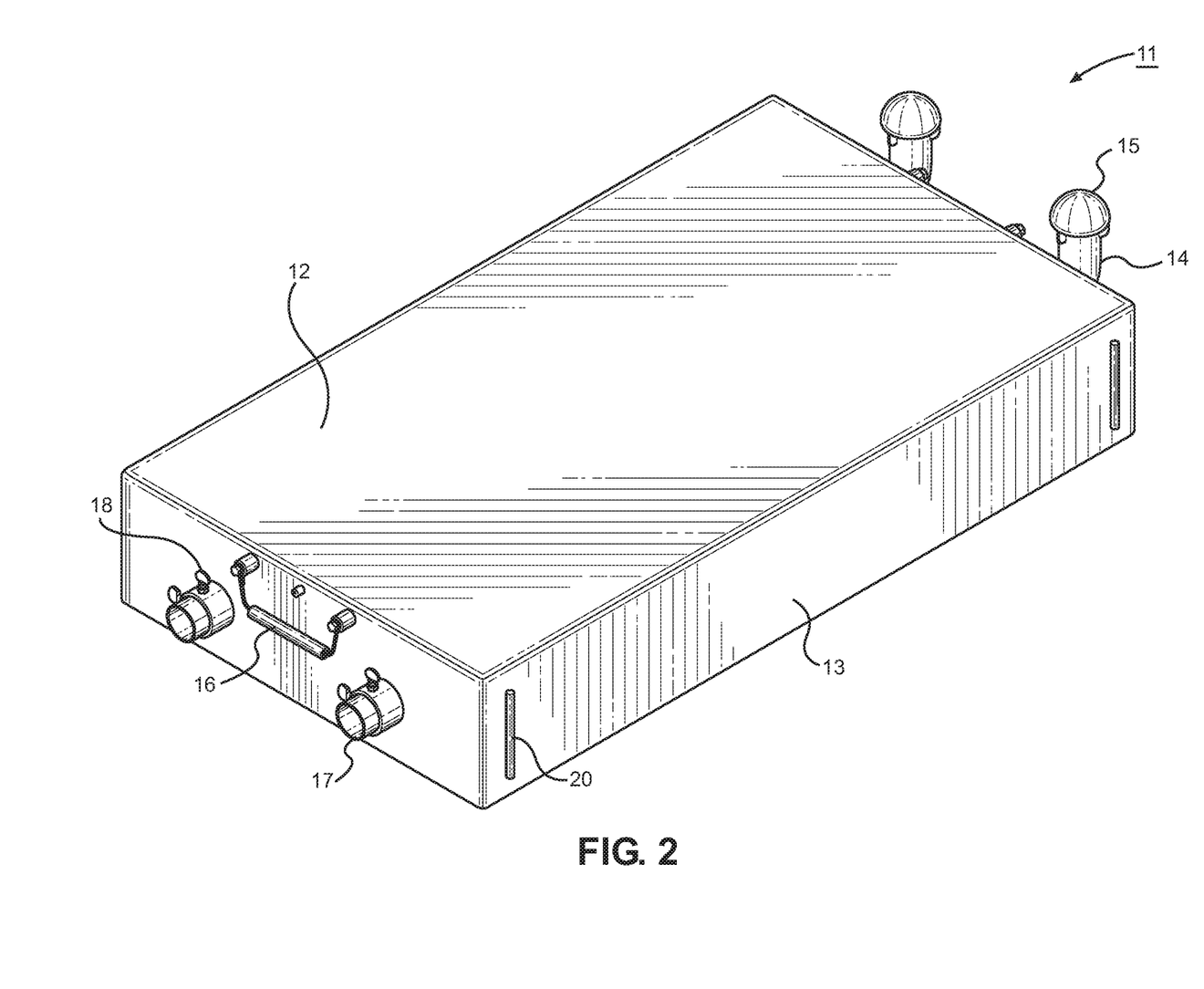
FIG. 2 shows a perspective view of an embodiment of the ground thawing device.
Figure 3A:
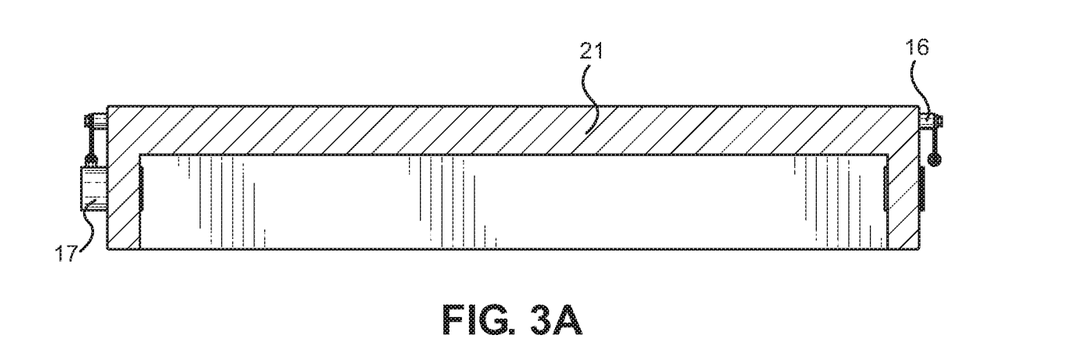
FIG. 3A shows side cross-sectional view of an embodiment of the ground thawing device taken along line 3A-3A of FIG. 4A.
Figure 3B:
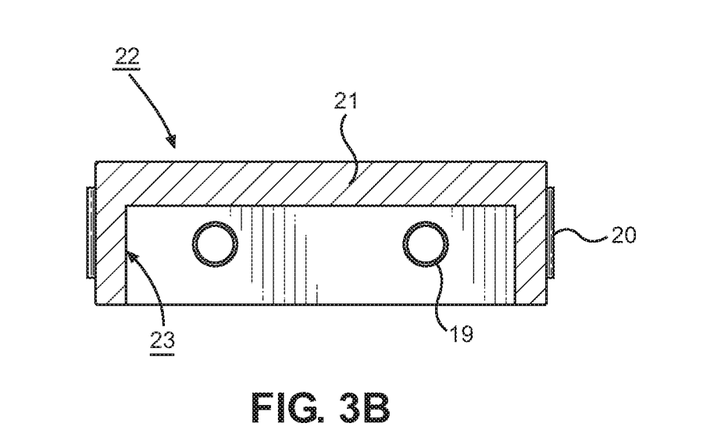
FIG. 3B shows side cross-sectional view of an embodiment of the ground thawing device taken along line 3B-3B of FIG. 4.
Figure 4A:
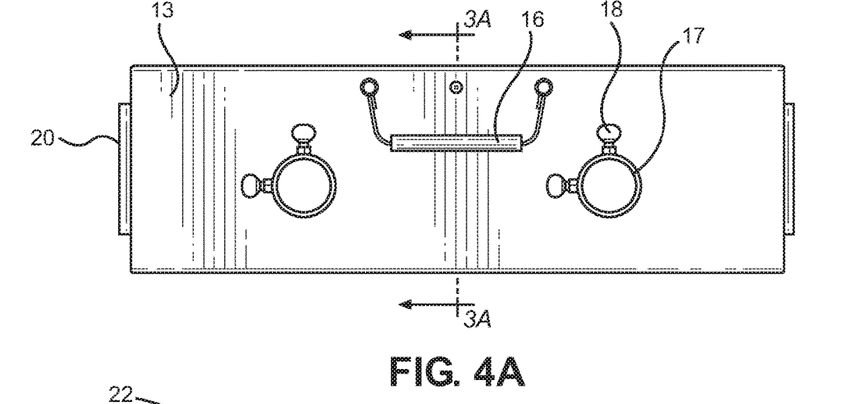
FIG. 4A shows a side elevation view of an embodiment of the ground thawing device.
Figure 4B:
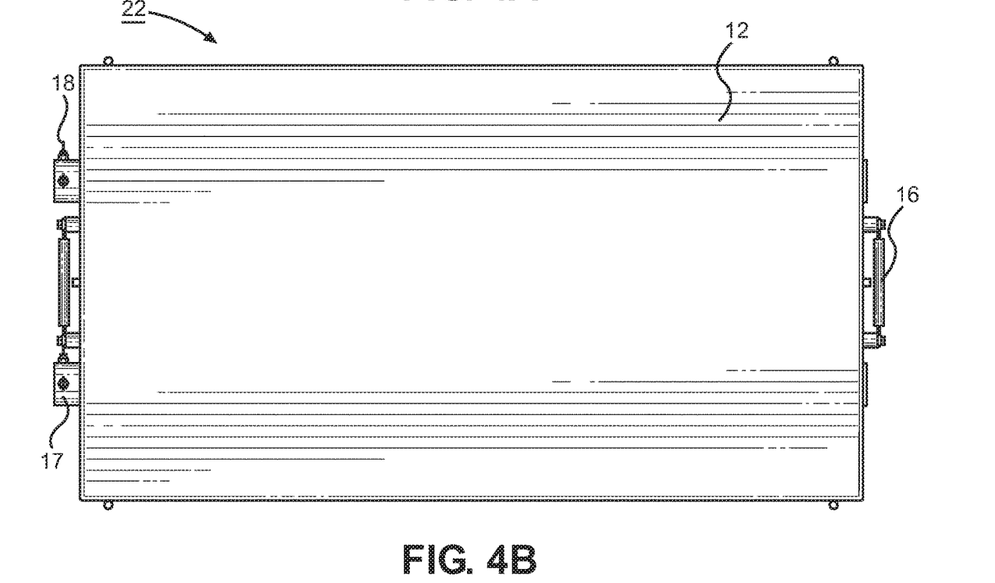
FIG. 4B shows an overhead view of an embodiment of the ground thawing device.
Figure 4C:
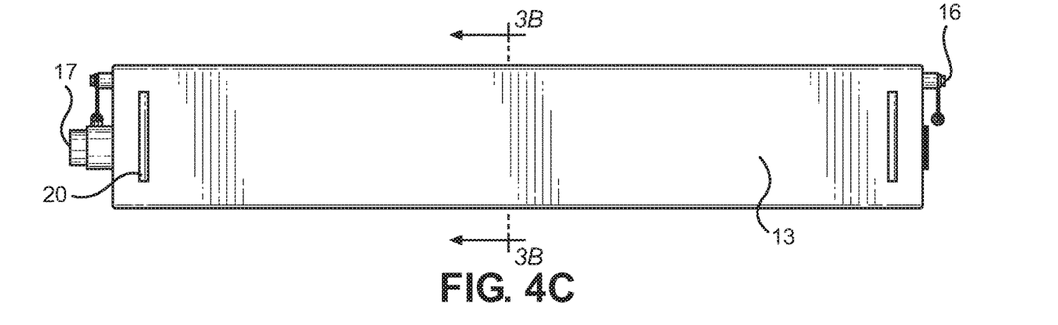
FIG. 4C shows a side elevation view of an embodiment of the ground thawing device.

Referring now to FIGS. 3A, 3B, 4A, 4B, and 4C there is shown a side cross-sectional view of an embodiment of the ground thawing device taken along line 3A-3A of FIG. 4A, a side cross-sectional view of an embodiment of the ground thawing device taken along line 3B-3B of FIG. 4, a side elevation view of an embodiment of the ground thawing device, an overhead view of an embodiment of the ground thawing device, and a side elevation view of an embodiment of the ground thawing device, respectively. In the illustrated embodiment, a layer of insulating material 21 is utilized between the interior 23 and exterior surfaces 22 of the housing for the ground thawing device 11. One or more handles 16 disposed on the exterior 22 of the sidewall 13 allow for the ground thawing device 11 to be easily transported. In the illustrated embodiment, apertures 19 are aligned such that that lengths of pipe may be received through the interior volume in a parallel configuration.

Figure 5:
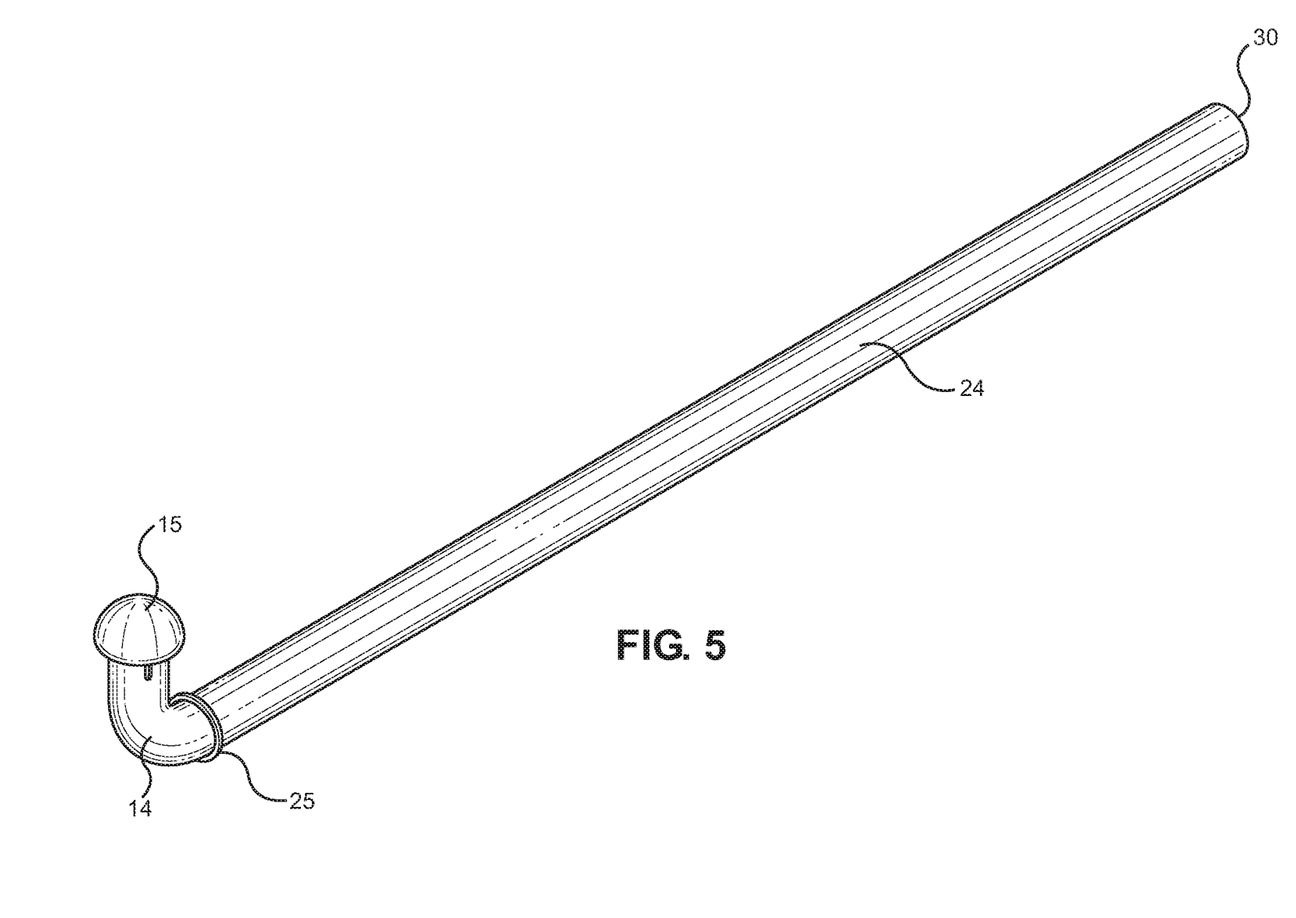
FIG. 5 shows a perspective view of the pipe utilized in an embodiment of the ground thawing device.

Referring now to FIG. 5, there is shown a perspective view of the pipe utilized in an embodiment of the ground thawing device. The pipe 24 is configured to be received through the apertures of the sidewall. The pipe 24 includes a first open end 30 adapted to connect to a valve regulating a fuel source. A burn chamber 14 is attached to a second end of the pipe 24 wherein a fuel being transported within the pipe 24 may be ignited. The burn chamber 14 comprises an angled section of pipe wherein slots allow for an ignition source to encounter the fuel being carried within the pipe. A semi-spherical wind guard 15 disposed on an end of the burn chamber 14 allows for air flow into and out of the pipe 24 while also protecting the burn chamber 14 from the weather.

A flange 25 located on the exterior of the pipe 24 just below the burn chamber 14 rests flush against the exterior surface 22 of the sidewall 13 when the pipe 24 is fully installed, such that the length of pipe 24 goes through opposing apertures 19 in the sidewall 13 of the ground thawing device 11. In an alternate embodiment, nozzles disposed at intervals along the length of the pipe 24 are configured to dispense fuel and heat the internal volume directly when the fuel source is ignited.

Figure 6:
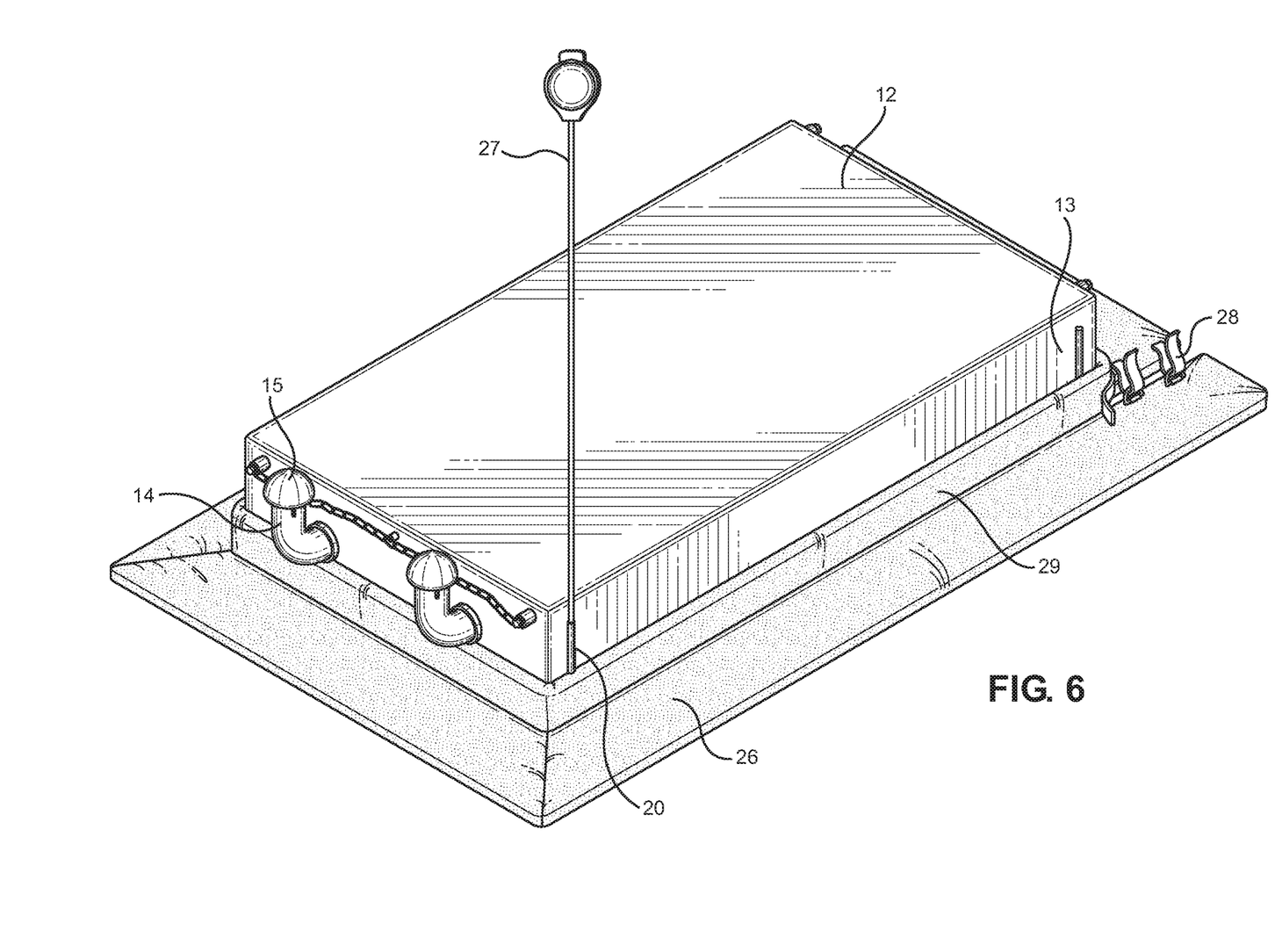
FIG. 6 shows a perspective view of an embodiment of the ground thawing device with heat capture flap.

Referring now to FIG. 6, there is shown a perspective view of an embodiment of the ground thawing device with heat capture flap. In an alternate embodiment, a heat capture flap 26 is provided and secured around the exterior surface 22 of the sidewall 13. The heat capture flap 26 comprises an L-shape design having a first surface that rests against the ground and a rim 29 that rests flush against the exterior surface 22 of the sidewall 13 of the ground thawing device 11. The heat capture flap 26 is adapted to envelope the entire exterior surface 22 of the sidewall 13 and secure to itself via fasteners 28. A bracket 20 is disposed on the exterior surface 22 of the sidewall 13 and adapted to secure an indicator 27. In the illustrated embodiment, a pole with a reflector attached to an end thereon serves as an indicator 27. In other embodiments, any suitable indicator 27 may be utilized.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ground thawing device, comprising:
   a housing having a base and a sidewall defining an interior volume having an open end, wherein the sidewall includes an interior side and an exterior side;
   aligned apertures disposed on the sidewall, wherein each of the aligned apertures includes a flange connected to and extending perpendicularly outward from the exterior side, wherein the aligned apertures are each configured to receive a pipe therethrough, wherein the pipe is configured to carry a fuel therethrough;
   a burn chamber affixed to a first end of the pipe, wherein the burn chamber includes an angled section of pipe with a plurality of slots therethrough, wherein the burn chamber includes a semi-spherical wind guard disposed on an end thereof, wherein the wind guard allows air to flow into and out of the pipe constantly while only partially blocking the burn chamber to protect the burn chamber from weather;

whereupon insertion of a second end of the pipe through the aligned apertures, the burn chamber is positioned exterior to the exterior side; and whereupon placement of the open end of the housing over a ground and ignition of the burn chamber, the interior volume is heated.

2. The ground thawing device of claim 1, wherein the housing includes a rectangular shape.

3. The ground thawing device of claim 1, wherein each aligned aperture of a pair of apertures of the aligned apertures is in axial alignment and is configured to receive the second end of the pipe therethrough.

4. The ground thawing device of claim 1, comprising an additional pipe and additional aligned apertures, whereupon insertion of a second end of the additional pipe through the additional aligned apertures, the additional pipe is adjacent to and parallel to the pipe.

5. The ground thawing device of claim 1, comprising a handle disposed on the exterior side of the sidewall.

6. The ground thawing device of claim 1, wherein the housing comprises a layer of heat insulation material disposed between an interior surface and an exterior surface of the sidewall and the base.

7. The ground thawing device of claim 1, comprising a heat capture flap secured around the exterior side of the sidewall, wherein the heat capture flap comprises an L shape design having a first surface that rests against the ground and a rim that rests flush against the exterior side of the sidewall, such that the heat capture flap is configured to envelop an entire exterior surface of the sidewall.

8. The ground thawing device of claim 1, comprising a fastener, wherein the fastener is configured to removably secure the pipe to the flange.

9. The ground thawing device of claim 1, comprising a bracket disposed on the exterior side of the sidewall, wherein the bracket is configured to secure an indicator to the exterior side of the sidewall.

10. The ground thawing device of claim 1, whereupon insertion of the second end of the pipe through the aligned apertures, the pipe extends through an entire length of the housing along a longitudinal axis thereof.

11. A ground thawing device, comprising:
a housing having a base and a sidewall defining an interior volume having an open end, wherein the sidewall includes an interior side and an exterior side;
a first pair of aligned apertures disposed on the sidewall, wherein the first pair of aligned apertures is configured to receive a first pipe therethrough, wherein the first pipe is configured to carry a fuel therethrough;
a first burn chamber affixed to a first end of the first pipe;
whereupon insertion of a second end of the first pipe through the first pair of aligned apertures, the first burn chamber is positioned exterior to the exterior side;
whereupon placement of the open end of the housing over a ground and ignition of the first burn chamber, the interior volume is heated;
wherein the first burn chamber includes a semi-spherical wind guard disposed on an end thereof, wherein the wind guard allows air to flow into and out of the pipe constantly while only partially blocking the first burn chamber to protect the first burn chamber from weather;
a second pair of aligned apertures disposed on the sidewall, wherein the second pair of aligned apertures are configured to receive a second pipe therethrough, wherein the second pipe is configured to carry the fuel therethrough;
a second burn chamber affixed to a first end of the second pipe;
whereupon insertion of a second end of the second pipe through the second pair of aligned apertures, positions the second burn chamber exterior to the exterior side;
whereupon placement of the open end of the housing over the ground and ignition of the second burn chamber, the interior volume is heated;
wherein the second burn chamber includes a semi-spherical wind guard disposed on an end thereof, wherein the wind guard allows air to flow into and out of the pipe constantly while only partially blocking the second burn chamber to protect the second burn chamber from weather;
wherein the first burn chamber includes a first angled section of pipe with a first plurality of slots therethrough;
wherein the second burn chamber includes a second angled section of pipe with a second plurality of slots therethrough;
wherein the first plurality of slots and the second plurality of slots are each configured to allow an ignition source to encounter the fuel to ignite the first burn chamber and the second burn chamber, respectively; and
wherein each aperture of each of the first and second pairs of aligned apertures includes a flange connected to and extending perpendicularly outward from the exterior side.

12. The ground thawing device of claim 11 wherein the housing comprises a layer of heat insulation material disposed between an interior surface and an exterior surface of the sidewall and the base.

13. The ground thawing device of claim 12, comprising a heat capture flap secured around the exterior side of the sidewall, wherein the heat capture flap is configured to envelop an entire exterior surface of the sidewall.

14. A ground thawing device, consisting of:
a housing having a base and a sidewall defining an interior volume having an open end, wherein the sidewall includes an interior side and an exterior side;
a heat capture flap secured around the exterior side of the sidewall, wherein the heat capture flap is configured to envelop an entire exterior surface of the sidewall;
a first pair of aligned apertures disposed on the sidewall, wherein the first pair of aligned apertures is configured to receive a first pipe therethrough, wherein the first pipe is configured to carry a fuel therethrough;
a second pair of aligned apertures disposed on the sidewall, wherein the second pair of aligned apertures is configured to receive a second pipe therethrough, wherein the second pipe is configured to carry the fuel therethrough;
a first burn chamber affixed to a first end of the first pipe;
a second burn chamber affixed to a first end of the second pipe;
whereupon insertion of a second end of the first pipe through the first pair of aligned apertures, the first burn chamber is positioned exterior to the exterior side;
whereupon insertion of a second end of the second pipe through the second pair of aligned apertures, the second burn chamber is positioned exterior to the exterior side;
whereupon placement of the open end of the housing over a ground and ignition of the first burn chamber and the second burn chamber, the interior volume is heated; and
wherein the first burn chamber and the second burn chamber each includes a semi-spherical wind guard disposed on an end thereof, wherein the wind guards allow air to flow into and out of the pipes constantly while only partially blocking the first burn chamber and the second burn chamber to protect the first burn chamber and the second burn chamber from weather.

15. The ground thawing device of claim 14, wherein the first burn chamber includes a first angled section of pipe with a first plurality of slots therethrough;

wherein the second burn chamber includes a second angled section of pipe with a second plurality of slots therethrough; and wherein the first plurality of slots and the second plurality of slots are each configured to allow an ignition source to encounter the fuel to ignite the first burn chamber and the second burn chamber, respectively.

16. The ground thawing device of claim 15, wherein each aperture of each of the first and second pairs of aligned apertures includes a flange connected to and extending perpendicularly outward from the exterior side.

17. The ground thawing device of claim 16, wherein the housing includes a layer of heat insulation material disposed between an interior surface and an exterior surface of the sidewall and the base.

\* \* \* \* \*